United States Patent [19]

Burrus

[11] 4,031,191
[45] June 21, 1977

[54] PROCESS FOR PRODUCING HYDROGEN FLUORIDE

[75] Inventor: Harry Otto Burrus, Wilmington, Del.

[73] Assignee: E. I. Du Pont de Nemours and Company, Wilmington, Del.

[22] Filed: Sept. 29, 1976

[21] Appl. No.: 728,004

Related U.S. Application Data

[63] Continuation of Ser. No. 545,354, Jan. 30, 1975, abandoned, which is a continuation-in-part of Ser. No. 401,129, Sept. 27, 1973, abandoned.

[52] U.S. Cl. ............................. 423/485; 423/483; 423/539
[51] Int. Cl.$^2$ .......................................... C01B 7/22
[58] Field of Search ........... 423/485, 483, 532, 539

[56] References Cited

UNITED STATES PATENTS

| 323,583 | 8/1885 | Kendall | 423/532 |
|---|---|---|---|
| 1,498,168 | 6/1924 | Hill | 423/532 |
| 1,896,483 | 2/1933 | Dohse | 423/539 |
| 2,156,791 | 5/1939 | Mohr | 423/539 |
| 2,753,245 | 7/1956 | Mitchell et al. | 423/485 |
| 2,813,006 | 11/1957 | Hayworth et al. | 423/539 |
| 2,846,290 | 8/1958 | Yacoe | 423/485 |
| 3,102,787 | 9/1963 | McMillan et al. | 423/485 |
| 3,325,248 | 6/1967 | Fournel | 423/539 |
| 3,404,953 | 10/1968 | Carson | 423/485 |
| 3,607,121 | 9/1971 | Watson et al. | 423/485 |

FOREIGN PATENTS OR APPLICATIONS

| 288,089 | 11/1965 | Australia | 423/532 |
|---|---|---|---|
| 37-9051 | 7/1962 | Japan | 423/539 A |
| 384,449 | 12/1932 | United Kingdom | 423/539 A |
| 627,848 | 8/1949 | United Kingdom | 423/539 A |
| 940,289 | 10/1963 | United Kingdom | 423/485 |

Primary Examiner—Edward Stern

[57] ABSTRACT

There is disclosed an improvement in the process of manufacturing HF wherein sulfur accumulates in HF process equipment. The improvement comprises adding to the process equipment sufficient $SO_3$ to remove the sulfur and emptying the equipment.

11 Claims, No Drawings

PROCESS FOR PRODUCING HYDROGEN FLUORIDE

CROSS-REFERENCE TO RELATED APPLICATIONS

This application is a continuation of my copending application Ser. No. 545,354, filed Jan. 30, 1975, now abandoned which application was a continuation-in-part of my copending application Ser. No. 401,129, filed on Sept. 27, 1973, now abandoned.

BACKGROUND OF THE INVENTION

Hydrogen fluoride is produced commercially by the reaction of a fluorine-containing mineral, e.g., fluorspar, with a mineral acid, such as sulfuric acid, at temperatures varying from 100° to 400° C. The reaction product from the initial reaction is then cooled, condensed and subsequently refined to produce anhydrous hydrogen fluoride.

In processes such as above, the initial reaction products will contain contaminants, including sulfur and sulfur forming impurities. These contaminants cause problems in subsequent steps of condensing and recovering the hydrogen fluoride by being deposited upon the piping and heat transfer surfaces or on filter surfaces. Such deposition leads to clogging and loss of cooling efficiency. Sulfur deposition is particularly troublesome in connection with regular and continuous running of the HF plant.

In known processes, the sulfur is generally separated in coolers consisting of bundles of tubes inside which the gases to be condensed pass and outside which the cooling medium, usually water, passes. In order to facilitate maintenance, these coolers generally consist of two (or more) cooling units in series, in the first of which most of the sulfur is separated and which thus needs more frequent cleaning, and in the second of which most of the cooling of gases takes place. Often, two or more of these coolers are connected to the HF process equipment in parallel and are used simultaneously so as to allow a greater flow of HF from the reaction chamber and hence a greater production of HF per unit of time. Periodically, these coolers must be shut down one by one to clean sulfur deposits therefrom. During shut-down the flow of HF from the reaction chamber must be reduced to allow the remaining cooling system or systems to effect sufficient heat transfer, thereby leading to reduced production of HF.

U.S Pat. No. 3,199,952 issued to Zanon teaches a method of producing HF in which sulfur is removed from HF gas generated by reacting fluorite with $H_2SO_4$ in a suitable chamber by passing the gas having suspended particles removed therefrom through a device with the function of acting as a catalyst and separating sulfur, so as to have sulfur separated out in a predetermined locality which is of easy access, convenient to clean and of large capacity.

In processes as described above when equipment is open to permit removal of sulfur deposits, residual HF can be released into the atmosphere. Furthermore, the removal of sulfur deposits is a costly and time-consuming operation, sometimes requiring up to 16 hours or more.

In assignee's pending application Ser. No. 296,565, filed on Oct. 11, 1972, now U.S. Pat. No. 3,865,929, a process is described wherein by the use of certain cooling techniques the buildup of sulfur coating on heat transfer surfaces of HF process equipment is reduced. However, this process is not widely applicable to existing HF processes because a change in process equipment may be required in many instances.

There exists a need for a process of manufacturing HF wherein sulfur which accumulates on process equipment can be readily removed by means which allow continuous operation of said process and greater retention of cooling efficiency.

SUMMARY OF THE INVENTION

I have discovered an improved process for making HF wherein sulfur deposits on HF process equipment, particularly on the heat transfer surface where the HF is cooled, can be removed by contacting the deposits with $SO_3$. The $SO_3$ can be added to the equipment in the vapor phase, with the addition being stopped when the buildup of $SO_2$ in the vapor phase ceases, or it can be added as a liquid in a suitable solvent wherein both $SO_3$ and $S_2O_3$ are dissolved. Suitable solvents include sulfuric acid and fluosulfonic acid ($HSO_3F$). The $SO_3$ is present in the solvent at a concentration of about 10–45% by weight. Preferably, the $SO_3$ is added as an oleum solution having about 20–35% $SO_3$ by weight. The $SO_3$ is maintained in the HF process equipment until the sulfur deposits are substantially removed. Temperature can be ambient but is preferably elevated with about 20°–100° C. being preferred and 30°–60° C. being most preferred.

After the sulfur deposits have been removed, the equipment is emptied. When the $SO_3$ is added as a liquid, the $SO_3$ solution containing the removed sulfur as $S_2O_3$ and $SO_2$ is drained and recycled to other steps in the HF process or stored in a separate tank for reuse. If desired, the $SO_3$ solution could be fed continuously from the storage tank into the process equipment and back during the sulfur removal stage. When the $SO_3$ is added as a gas, the equipment is emptied of the resulting gaseous mixture by purging. Accordingly, since no discharge from the system is required nor need the equipment be opened, air and water pollution problems are eliminated. Furthermore, the process does not introduce new chemicals into the HF process.

Although in the present invention sulfur is removed by closing off the cooling unit from the other HF process equipment, the present process has the advantage that under preferred conditions removal can be effected rapidly, i.e., within about 1–2 hours, thus allowing more efficient cooling, more frequent removal of sulfur from a cooler, and consequently, a greater production of HF with smaller process equipment. Moreover, in the present process, possibility of pollution of the atmosphere is greatly diminished.

DETAILED DESCRIPTION OF THE INVENTION

The improvement disclosed herein can be used in conjunction with any process for making gaseous hydrogen fluoride wherein the gaseous, crude reaction product contains sulfur contaminant which deposit on the process equipment, particularly the cooling and condensing equipment, and also filter surfaces. This improvement is especially useful in well-known commercial processes for producing hydrogen fluoride wherein an alkali metal fluoride or alkaline earth metal fluoride, such as fluorspar, is treated with a strong mineral acid, such as sulfuric acid, since minerals containing these fluorides often contain sulfide impurities.

The process of the invention will now be described as it particularly pertains to the fluorspar-sulfuric acid reaction, which is a preferred embodiment. It is to be understood that the instant invention is not so limited but has a general utility as mentioned above.

Fluorspar and sulfuric acid react to form calcium sulfate and hydrogen fluoride. The reaction is endothermic and various methods are used for supplying the necessary heat. One particularly useful method of supplying this heat is by the addition of sulfur trioxide and steam to the reaction zone. This method is described in detail in U.S. Pat. No. 3,102,787 and is a preferred embodiment for the present invention. The teachings of that patent with respect to providing heat in said manner are incorporated herein by reference.

In the process described in this patent a bed of metal fluoride, such as fluorspar, is contacted with a moving stream of sulfuric acid vapor, sulfur trioxide vapor and water vapor at a temperature of about from 100° C. to the boiling point of sulfuric acid at operating pressure. A liquid phase of condensed sulfuric acid is continuously maintained on the surface of the metal fluoride.

The hydrogen fluoride gas from the fluorsparsulfuric acid reaction normally leaves the reaction zone at a temperature between 100° and 250° C., usually about 170° C. This gas stream is primarily hydrogen fluoride and is saturated with $H_2SO_4$ vapor but also contains impurities from the reaction zone. These impurities will vary with the composition of the raw materials used in the reaction.

In most operations the gas stream from the reaction will contain small particles of fluorspar and/or calcium sulfate; thus initially the stream is fed into a gas scrubber wherein it is scrubbed with sulfuric acid to remove the dust. The operation of a typical dust scrubber is described in detail in U.S. Pat. No. 3,347,022. The gas leaving the dust scrubber will be at about its dew point and at a temperature of 60° to 200° C., normally about 140° C. This gas stream will be labeled the crude hydrogen fluoride gas stream.

This crude hydrogen fluoride gas stream still contains impurities which include the sulfur, sulfur dioxide, sulfuric acid, silicon tetrafluoride, fluosulfonic acid, hydrogen sulfide, and calcium sulfate. Furthermore, it is believed that some of the components of the crude gas stream react with each other under the conditions of the cooling and other recovery steps to produce sulfur, i.e., the $SO_2$ present may react with hydrogen sulfide.

It is these sulfur and sulfur-forming impurities present in this gas stream that create the problems in the subsequent recovery steps, particularly in the steps wherein the HF gas is cooled.

The sulfur particles which normally form in the gas stream during recovery usually have a size of 5 microns and less in diameter. These tiny particles of sulfur adhere to any relatively cold surface in the HF process equipment, e.g., the surfaces of heat exchangers which are removing heat from this gas stream. The surface films formed by this sulfur greatly reduce the heat transfer effectiveness of the equipment.

After leaving the dust scrubber, the crude HF gas stream is treated in various stages to remove the undesired components and produce refined HF. It is in the cooling equipment of these purification stages that the sulfur deposits usually form. The exact nature of the cooling equipment employed is not critical, i.e., it can be coolers, surface condensers, direct contact condensers, wet gas scrubbers, refrigeration coils and the like.

Thus, the present improvement is useful in conjunction with the purification process described in U.S. Pat. No. 2,047,210. In this process the crude gas from the dust scrubber is initially cooled in one or two shell and tube heat exchanges from 140–170° C. to 5–40° C., and the condensed liquid formed is removed. The gas is then contacted with cold liquid HF at −20 to −25° C. in contact condensers to produce a product liquid which is subsequently distilled.

The present invention is also useful in the contact cooling equipment described in assignee's pending application Ser. No. 296,565, filed Oct. 11, 1972, now U.S. Pat. No. 3,865,929; although with the use of the techniques described in this application, the buildup of sulfur deposits is almost eliminated. The process of the invention can be used to remove sulfur collected by the filters associated with this contact cooling equipment.

After the cooling equipment has been used for a period of time, sulfur deposits will build up on the walls of the heat transfer surfaces. The sulfur in these deposits can be in the form of granules or in an amorphous form.

The reaction of $SO_3$ with sulfur, i.e., $$2SO_3 + S \rightarrow 3SO_2$$

is known in the art, e.g., U.S. Pat. No. 2,156,791 or British Pat. No. 627,848. However, no one has applied this reaction to the solution of a long-standing problem in the HF industry, i.e., the removal of sulfur deposits from the heat transfer surfaces.

The above reaction probably occurs in two steps. In the first step the $SO_3$, e.g., the oleum, dissolves the sulfur according to the following reaction:

$$S + SO_3 \rightarrow S_2O_3$$

The washing solution then is held, optionally with heating, and the following reaction occurs:

$$S_2O_3 + SO_3 \rightarrow 3SO_2$$

In the present invention removal of sulfur is effected, by closing off the cooler or filter through which the HF gas is being passed and treating sulfur deposits contained in the cooler or filter with $SO_3$ as taught herein. In the process of the invention the $SO_3$ can be used in either the liquid or vapor phase, use of the liquid phase being preferred. In vapor phase operations, the $SO_3$ would be fed into the equipment to be cleaned until the buildup of $SO_2$ in the vapor ceases. At that time the cleaning operation will have been completed.

In the preferred embodiment the $SO_3$ is added to the process equipment as a solution in a suitable solvent. Suitable solvents include sulfuric acid and fluosulfonic acid. Other solvents in which the $SO_3$ and $S_2O_3$ dissolve can be used.

When used with suitable solvents, the $SO_3$ will be present in concentrations of 10 to 45% by weight, preferably 20 to 35% by weight. A preferred embodiment is the use of oleum having 20 to 35% by weight. The amount of $SO_3$ added will, of course, vary depending upon the amount and type of sulfur involved, and the temperature. The only requirement is that sufficient $SO_3$ be added to remove the sulfur present, i.e., greater than 2 molar parts of $SO_3$ be added to remove the sulfur present, i.e., greater than 2 molar parts of $SO_3$ for every molar part of sulfur.

In preferred embodiments a large excess, 5 to 20 times stoichiometric, of $SO_3$ is used and the equipment is almost completely filled with an oleum solution having about 20 to 35% by weight. Under these conditions, during the course of sulfur removal, the total amount of $SO_3$ available for reaction will only be reduced slightly. Since this solution will be reused, this procedure does not create waste and insures that almost all of the sulfur will be removed.

Once the equipment has been filled, it can be heated to increase the rate of $SO_2$ formation or the $SO_3$ solution can be heated prior to being added to the equipment. Thus, the solution can be heated to a temperature as high as 100° C. The oleum solution having 20–35% $SO_3$ by weight is preferably heated to about 50°–60° C. However, if a longer residence time does not create any problem, no heating is required and the reaction will occur at ambient temperatures of about 20° C. Experimental tests have determined that the reaction and solution of sulfur is oleum is directly proportional to the surface area. Thus, the rate of solution of sulfur in oleum having 35% $So_3$ by weight is 0.005 g/min/cm² at 53° C. and 0.0004 g/min/cm² at 24° C.

Hold time of the $SO_3$ solution in the equipment will also vary depending on the amount of sulfur and temperature. Generally, $SO_3$ treatment is continued until the production of $SO_2$ ceases. This can be measured by standard meters or by measuring the residual $S_2O_3$ concentration. In typical embodiments the hold time will vary from 1 to 24 hours. A portion or all of the hold time need not be conducted in the process equipment. Thus, the equipment can be drained and the solution held for the appropriate hold time in a storage tank, or the $SO_3$ solution could be recycled continuously between the process equipment and a storage tank.

When sulfur removal is effected at elevated temperatures, by use of $SO_3$ in a suitable solvent and conducting a portion or all of the hold time outside of the process equipment, or at a frequency which prevents large buildups, certain advantages are obtained in the HF process. First, a greater production of HF can be maintained per unit of time because a greater heat transfer capacity results. Secondly, the greater heat transfer resulting from the present invention allows the size or number of coolers to be decreased.

After the sulfur has been removed, the equipment is emptied by draining therefrom the $SO_3$ washing solution which now contains $S_2O_3$ and $SO_2$ and which can be recycled to the dust scrubber where it is added to the scrubbing solution and used in this part of the HF process. Alternatively, the solution can be drained to a separate storage tank wherein makeup $SO_3$ is added and the solution stored for reuse during the cleaning cycle. When sulfur is removed by addition of $SO_3$ gas, the equipment is emptied of the resulting gaseous mixture by purging with a gas which is inert to the HF gas stream, e.g. air, nitrogen or process vent-gas. The purged gas can be recycled to a prior process step. Alternatively, the system can be immediately opened to the HF stream, thereby effecting suitable purging.

The invention will now be exemplified by the following illustrative embodiment. All parts and percentages are by weight unless otherwise indicated.

EXAMPLE

A bank of two shell and tube coolers is used in the process for making HF. During operation the coolers cool the crude HF gas from 140° C. to 30° C. After being in operation for 24 hours, sulfur deposits will build up on the internal surfaces of the coolers in the amount of approximately 45–182 kilograms.

At this time the sulfur deposits can be removed by filling the coolers with an oleum solution having 35% $SO_3$ by weight. Assuming 55 kg. of sulfur was deposited, only about 785 kg. of this oleum would be necessary to provide the 275 kg. of $SO_3$ needed to react with the sulfur. Actually filling the coolers requires 7,265 kg. of oleum which provides a large excess of $SO_3$. Circulating from a large storage tank would provide an even greater excess $SO_3$.

The oleum will be maintained at 30° to 50° C. for one hour. The oleum solution will be then drained and the sulfur deposits will have been removed from the walls.

The drained solution can be fed to the dust scrubber, or if desired, fed into a separate tank, reconstituted with $SO_3$, and then reused for sulfur removal at the appropriate time.

I claim:

1. In a process for producing HF by reacting a metal fluoride selected from the group consisting of alkali metal fluorides and alkaline earth metal fluorides with a mineral acid, the reaction product thereafter being cooled, where in said process sulfur deposits accumulate in the cooling equipment, the improvement comprising adding to the cooling equipment when said equipment is not being used to cool the reaction product, sufficient $SO_3$ to remove the sulfur deposits and thereafter emptying the equipment.

2. The process of claim 1 wherein the metal fluoride is fluorspar and the mineral acid is sulfuric acid.

3. The process of claim 1 wherein the $SO_3$ is at a temperature of about 20°–100° C. while removing the sulfur.

4. The process of claim 1 wherein the $SO_3$ is in a solvent selected from the group consisting of sulfuric acid, fluosulfonic acid and mixtures thereof at a concentration of about 10–45% by weight based upon the combined weight of $SO_3$ and solvent.

5. The process of claim 3 wherein the $SO_3$ is in a solvent selected from the group consisting of sulfuric acid, fluosulfonic acid and mixtures thereof at a concentration of about 10–45% by weight based upon the combined weight of $SO_3$ and solvent.

6. The process of claim 4 wherein the solvent is sulfuric acid.

7. The process of claim 5 wherein the solvent is sulfuric acid.

8. The process of claim 4 wherein the solvent is fluosulfonic acid.

9. The process of claim 5 wherein the solvent is fluroulfonic acid.

10. In a process for producing HF by contacting a bed of fluorspar with a moving stream of sulfuric acid vapor, sulfur trioxide vapor and water vapor at a temperature of about from 100° C. to the boiling point of sulfuric acid at operating pressure and continuously maintaining on surface of the fluorspar a liquid phase of condensed sulfuric acid, the reaction product thereafter being cooled, where in said process sulfur deposits accumulate in the cooling equipment, the improvement comprising adding to the cooling equipment, when said equipment is not being used to cool the reaction product, sufficient $SO_3$ to remove the sulfur deposits and thereafter emptying the equipment.

11. A process for removing sulfur deposits which accumulate in the cooling equipment in an HF manufacturing process consisting essentially of adding to the cooling equipment, when said equipment is not being used to cool the reaction product, sufficient $SO_3$ to remove the sulfur deposits and thereafter emptying the equipment.

* * * * *

UNITED STATES PATENT OFFICE
CERTIFICATE OF CORRECTION

PATENT NO. : 4,031,191
DATED : June 21, 1977
INVENTOR(S) : Harry Otto Burrus

It is certified that error appears in the above-identified patent and that said Letters Patent are hereby corrected as shown below:

Column 2, line 60, "contaminant" should be -- contaminants --.

Column 3, line 56, after "during" add -- crude --.

Column 4, line 33, "the" (third occurrence) should be --as --.

Column 4, line 58, after "35%" add $SO_3$ --.

Column 4, lines 63 and 64, delete "be added to remove the sulfur present, i.e., greater than 2 molar parts of $SO_3$".

Column 5, line 1, after "35%" add -- $SO_3$ --.

Column 5, line 17, "is oleum" should be -- in oleum --.

Column 6, lines 46 and 47, "fluroulfonic" should be -- fluosulfonic --.

Signed and Sealed this

Sixth Day of February 1979

[SEAL]

Attest:

RUTH C. MASON
Attesting Officer

DONALD W. BANNER
Commissioner of Patents and Trademarks